(12) United States Patent
Pulnikov

(10) Patent No.: US 10,965,197 B2
(45) Date of Patent: Mar. 30, 2021

(54) METHOD OF COMPOSING A SLEEVE ASSEMBLY FOR CONTAINMENT PURPOSES IN HIGH CENTRIFUGAL APPLICATIONS

(71) Applicant: ATLAS COPCO AIRPOWER, NAAMLOZE VENNOOTSCHAP, Wilrijk (BE)

(72) Inventor: Aleksandr Pulnikov, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 1300 days.

(21) Appl. No.: 14/406,705

(22) PCT Filed: Mar. 15, 2013

(86) PCT No.: PCT/IB2013/000401
§ 371 (c)(1),
(2) Date: Dec. 9, 2014

(87) PCT Pub. No.: WO2013/160739
PCT Pub. Date: Oct. 31, 2013

(65) Prior Publication Data
US 2015/0145369 A1    May 28, 2015

Related U.S. Application Data

(60) Provisional application No. 61/639,114, filed on Apr. 27, 2012.

(51) Int. Cl.
*H02K 15/03* (2006.01)
*B29C 70/42* (2006.01)
(Continued)

(52) U.S. Cl.
CPC ............ *H02K 15/03* (2013.01); *B29C 70/34* (2013.01); *B29C 70/347* (2013.01); *B29C 70/42* (2013.01);
(Continued)

(58) Field of Classification Search
CPC ....... B29C 70/34; B29C 70/347; B29C 44/06; H02K 15/03; B29L 2023/001;
(Continued)

(56) References Cited

U.S. PATENT DOCUMENTS 3,704,194 A * 11/1972 Harrier ............... B29C 33/0033
156/245
3,706,615 A * 12/1972 Nishiyama et al. .. B29C 53/582
156/169
(Continued)

FOREIGN PATENT DOCUMENTS

DE    102007012822 A1    5/2008
JP    S58-42428 A    3/1983
(Continued)

OTHER PUBLICATIONS

Sarah Black, Are high temperature thermosets ready to go commercial?, Nov. 1, 2004 (Year: 2004).*
(Continued)

*Primary Examiner* — Jacob T Minskey
*Assistant Examiner* — Caroline Montiel
(74) *Attorney, Agent, or Firm* — Bacon & Thomas, PLLC

(57) ABSTRACT

This invention relates to a method for composing a sleeve assembly suitable for use in containment purposes in high-speed machine that are subjected to high operational temperatures. The method has the steps of providing a composite sleeve and winding at least two layers of woven fabric on top of the composite sleeve and each other, where the woven fabric is impregnated with a thermoset resin. The method (Continued)

additionally has the step of optionally winding a perforated layer on top of an outermost layer of the layers of woven fabric to remove excess resin when the woven fabric is wound over the composite sleeve. The method also includes the steps of wrapping an absorption layer over the composite sleeve for absorbing the excess resin, curing the thermoset resin, and removing the absorption layer and the perforated layer after the curing.

15 Claims, 2 Drawing Sheets

(51) Int. Cl.
| | | |
|---|---|---|
| B32B 37/14 | (2006.01) | |
| B32B 37/26 | (2006.01) | |
| B32B 38/10 | (2006.01) | |
| H02K 1/28 | (2006.01) | |
| H02K 15/12 | (2006.01) | |
| H02K 1/27 | (2006.01) | |
| B29C 70/34 | (2006.01) | |
| B32B 5/12 | (2006.01) | |
| B32B 1/08 | (2006.01) | |
| B32B 5/26 | (2006.01) | |
| B32B 5/02 | (2006.01) | |
| B29L 23/00 | (2006.01) | |
| B32B 27/12 | (2006.01) | |
| B32B 3/26 | (2006.01) | |
| B29L 31/00 | (2006.01) | |

(52) U.S. Cl.
CPC .............. *B32B 1/08* (2013.01); *B32B 5/024* (2013.01); *B32B 5/12* (2013.01); *B32B 5/26* (2013.01); *B32B 37/142* (2013.01); *B32B 37/26* (2013.01); *B32B 38/10* (2013.01); *H02K 1/278* (2013.01); *H02K 1/28* (2013.01); *H02K 15/12* (2013.01); *B29L 2023/001* (2013.01); *B29L 2031/748* (2013.01); *B32B 3/266* (2013.01); *B32B 27/12* (2013.01); *B32B 2260/023* (2013.01); *B32B 2260/046* (2013.01); *B32B 2307/51* (2013.01); *B32B 2307/726* (2013.01); *B32B 2307/736* (2013.01); *B32B 2307/748* (2013.01); *B32B 2597/00* (2013.01)

(58) Field of Classification Search
CPC .. B32B 5/024; B32B 1/08; B32B 5/12; B32B 37/142; B32B 2260/023; B32B 2023/001
See application file for complete search history.

(56) References Cited

U.S. PATENT DOCUMENTS

| | | | | |
|---|---|---|---|---|
| 3,962,394 | A * | 6/1976 | Hall | B29C 53/56 264/573 |
| 5,021,698 | A * | 6/1991 | Pullen | H02K 1/2793 310/112 |
| 5,122,704 | A * | 6/1992 | Blakeley | H02K 3/24 310/192 |
| 5,405,561 | A * | 4/1995 | Dais | B26D 9/00 156/204 |
| 6,295,782 | B1 * | 10/2001 | Fyfe | E04C 3/34 52/2.15 |
| 6,355,318 | B1 * | 3/2002 | Tailor | B29C 66/49 138/109 |
| 8,021,752 | B2 * | 9/2011 | Honda | C08G 59/50 428/413 |
| 2007/0182071 | A1 | 8/2007 | Sekido et al. | |
| 2009/0098324 | A1 * | 4/2009 | Hasegawa | B29C 70/446 428/36.4 |
| 2009/0236091 | A1 * | 9/2009 | Hammami | B29C 53/8016 166/242.1 |
| 2010/0019589 | A1 * | 1/2010 | Saban | H02K 3/12 310/52 |
| 2010/0171383 | A1 * | 7/2010 | Petrov | H02K 1/02 310/156.28 |
| 2011/0099793 | A1 | 5/2011 | Pulnikov | |
| 2012/0141705 | A1 * | 6/2012 | Booker | B32B 1/08 428/34.5 |

FOREIGN PATENT DOCUMENTS

| | | | |
|---|---|---|---|
| JP | S60-216755 | A | 10/1985 |
| JP | H02-74326 | * | 3/1990 |
| JP | H02-74326 | A | 3/1990 |
| JP | 2004292533 | A | 10/2004 |

OTHER PUBLICATIONS

International Search Report (ISR) dated Sep. 8, 2014, for PCT/IB2013/000401.

* cited by examiner

METHOD OF COMPOSING A SLEEVE ASSEMBLY FOR CONTAINMENT PURPOSES IN HIGH CENTRIFUGAL APPLICATIONS

BACKGROUND OF THE INVENTION

1. Field of the Invention

This invention relates to a method of composing a sleeve assembly comprising a composite sleeve, said sleeve assembly being suitable to be used for containment purposes in high-speed machines and subjected to high operational temperatures, such as 160° C. or higher.

2. Discussion of the Related Art

Possible use for such sleeve assemblies would be to keep permanent magnets in a precompressed state at all speeds. A mounting procedure of such sleeve assemblies has been described in U.S. patent application No. 2011/0099793 A1, which is incorporated by reference.

At high centrifugal loads it is important to maintain compression between layers of a composite sleeve in order to prevent delamination and detachment of fibers. For this purpose a hoop layer is normally used as an external layer of such a containment sleeve.

High operational temperature requires the use of thermally stable polymers, but such polymers are comparatively brittle. Therefore composite sleeves made of such polymers are more prone to internal delamination and damage during assembly with shrink-fits approaching or even exceeding 1%. Such high shrink-fits are used to provide contact pressures with a composite sleeve of minimal thickness. Since every layer contributes to the contact pressure imposed by the sleeve, the intermediate layers become sandwiched between the top layer of the sleeve and, for example, a rotor around which the sleeve is being provided. So unwinding of the sleeve would always start at the top layer of the sleeve.

A hoop layer is most commonly used as an external layer, because it has high radial stiffness and thus provides the necessary contact pressure. However fibers in such a layer are oriented in parallel and there is little interlinkage between them. Fibers located at the side of the external hoop layer are the least supported or least interlinked fibers in the sleeve and therefore serve as an origin for unwinding.

SUMMARY OF THE INVENTION

In this invention a solution for this problem is proposed. It is suggested to wind at least two layers of a bidirectional woven fabric on top of the sleeve. There is a considerable amount of interlinkage between fibers which solves the problem of unwinding. Although only the outer layer is adjusted in such a sleeve, the overall performance of the sleeve substantially improves, as unwinding is one of the restricting factors for performance of such containment sleeves.

There are different ways for applying the composite sleeve for reinforcement:

1) A bidirectional fabric preimpregnated with semi-cured thermoset resin could be wound on top of a premade composite sleeve. The prepreg should preferably have a similar thermal limit as the epoxy used during winding of the composite sleeve. This method is fairly simple and is applied easily. However, extra costs are associated with this method due to the use of this prepreg material and the costs for curing the prepreg.
2) A dry bidirectional fabric could be impregnated with the same type of resin as the one used during winding of the composite sleeve and wrapped around the premade composite sleeve. Use of the same type of resin will ensure thermal compatibility of the external layer and the rest of the composite sleeve. The expression "of the same type" used throughout this text, means that the resins are of identical composition and physical properties, however, the invention is in no way limited as such.
3) A dry bidirectional fabric could be impregnated with the same type of resin as the one used during winding of the composite sleeve and wrapped around the wet composite sleeve. If the fabric is sufficiently light, it could also be impregnated with excess resin coming out to the surface of the composite sleeve during winding. The use of the same type of resin will ensure good bonding between layers and provide the same thermal limit for the whole composite sleeve.

Winding with a broad fabric requires special equipment and most filament winding machines are not able to wind such fabric. It is also not a trivial task to apply pretension to the fabric as it is done with fiber tows during wet filament winding. So if winding is followed by wrapping and no additional measures are applied, the outer layer of the sleeve would have fairly low fiber content.

Performance of composite materials is greatly affected by the fiber content. For example, a composite tube with increased fiber content has an equivalent increase in radial stiffness per thickness. So the required contact pressure could be achieved with smaller thickness of the composite sleeve. Thickness reduction of composite sleeves is of particular importance in permanent magnet machines as this helps to increase power density and overall efficiency of the motor through the increase of the flux density in the air-gap of the motor.

Additionally, in many containment applications it is important to achieve a smooth surface. For instance, in case of high speed machines, roughness on the surface of the composite sleeve may cause additional friction losses and excessive heating of the sleeve.

A smooth finish can be achieved by keeping the excess resin on the surface of the sleeve. It is worth noting that since epoxy expands during curing of the composite the outer epoxy layer could become excessively thick and prone to damage during assembly and detachment at high speeds.

The following method could be applied to solve the aforementioned problems. A layer of perforated shrink tape is wound on top of the outer layer of the sleeve in order to provide a smooth finish, but also arranged so that excessive epoxy is removable from the outer layer.

Alternatively, a layer of a perforated plastic could be put on top of the sleeve in order to provide an exit path for excess resin. For example, a single layer of perforated shrink tape could be applied on top of the sleeve. Of course, a few layers of conventional shrink tape could be wound and then a few passes of a roller with pins could be rolled around the wound shrink tape in order to create holes. However this leads to damage of underneath fibers and deteriorates performance of the composite, which is critical for highly loaded containment sleeves. For that reason it is better to use a perforated plastic.

Additionally, a layer or a few layers of a peel-ply can then be wrapped over the sleeve in order to absorb excessive epoxy that is bled through the holes of the perforated plastic layer. On top of the layer of peel-ply additional layers of non-perforated shrink tape can be wound in order to create an outer pressure on the outer surface of the composite sleeve during curing. This method is particularly effective for large pipes, because with increased diameter contact pressure exerted by a single layer of shrink tape proportionally reduces. So in order to achieve sufficient pressure on the outer surface, additional layers of shrink tape or alternative measures for application of external pressure are necessary.

This method would also be applicable for an external layer made of prepregs, because external pressure helps to increase the fiber content and remove air-pockets. Since prepregs are applied on a premade sleeve, larger external pressures would be possible. In order to achieve good quality of prepreg-based composites, it is suggested to use pressures in excess of 3-5 bar in order to reach high fiber content. This requires the use of an autoclave, which is not always available or applicable. Recent investigations reveal that the drying out of fibers in epoxy based composites does not start until pressures of 13-15 bar are reached and optimal pressures in this regard are equal to 10 bar. As the method suggested in this invention does not impose limitation on the outer pressure other then the stiffness and the strength of the premade sleeve itself, a highly competitive quality of the composite can be achieved.

This method is also applicable for an external layer made of a wet fabric and wrapped around a premade composite sleeve. As in the previous case, this layer becomes squeezed between the premade sleeve and the layers of tape wound on top of the external layer of wet fabric. Again no limit on external pressures is applicable other then the stiffness and the strength of the premade sleeve itself.

In order to diminish production costs, shrink tape can be substituted by any reusable preferably elastic tape which is configured to achieve the required contact pressure on the outer surface of the sleeve. After curing this elastic tape can be removed and reused. In order to avoid contamination of said tape with excess resin an intermediate protective layer of conventional plastic could be wound on top of the layers of peel-ply.

BRIEF DESCRIPTION OF THE DRAWINGS

The present invention is illustrated with the intention of better showing the characteristics of the invention, as an example without being limitative in any way, to describe a method for composing a sleeve assembly with reference to the accompanying figures.

DETAILED DESCRIPTION OF THE INVENTION

Figure 1:
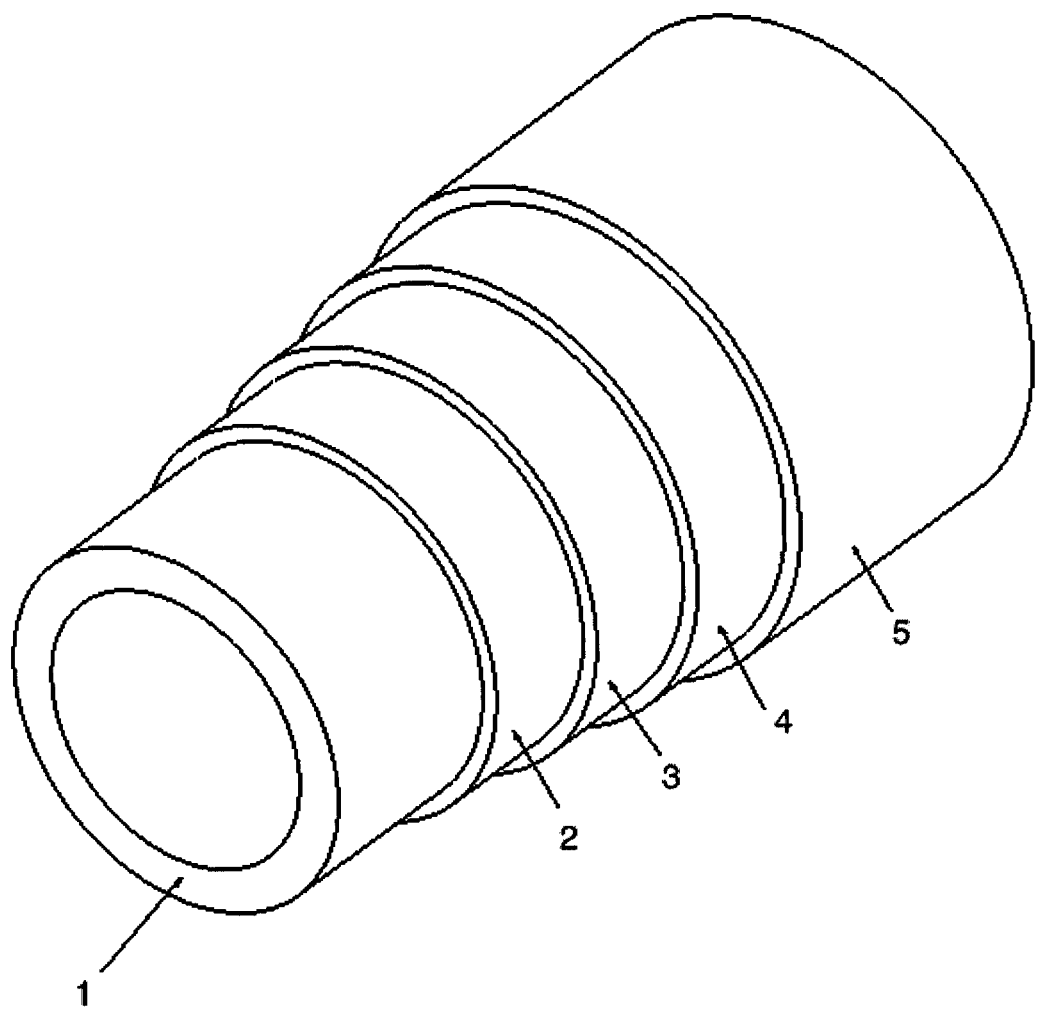
FIG. 1 schematically represents a perspective view of a sleeve assembly during its manufacturing process.

FIG. 1 shows a composite sleeve 1, for example, obtained through filament winding.

On top of said composite sleeve 1 are provided two layers of woven fabric 2. According to a preferred characteristic of the invention, at least one of said layers of woven fabric 2 comprises bidirectional woven fabric. The invention, however, is not limited as such to include the bidirectional woven fabric.

Preferably, each of a first plurality of fibres making part of said woven fabric extends in a respective plane extending perpendicularly to a longitudinal central axis of said composite sleeve 1. A second plurality of fibres making part of said woven fabric 2 preferably extends crosswise with respect to the direction of said first plurality of fibres.

In case use is made of a bidirectional woven fabric 2, the angle between the directions of said first and second plurality of fibres is preferably 90°, however, also other angles are possible, such as for example an angle of approximately 60°.

Figure 2:
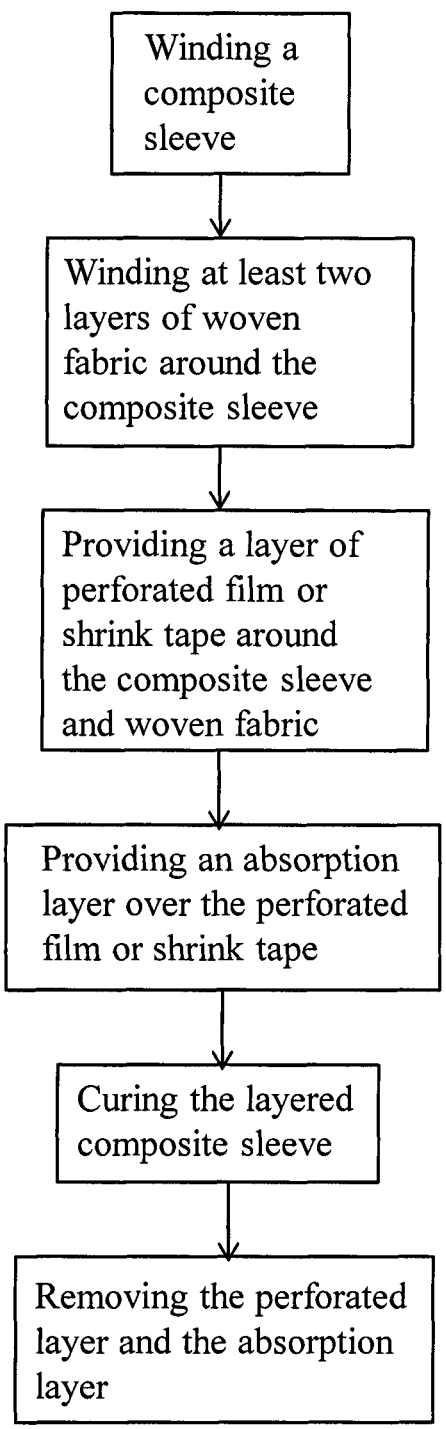
FIG. 2 schematically represents the process for composing a sleeve assembly used for containment purposes in high-speed machines.

According to the invention, as seen in FIG. 2, while carrying out the composition method, a perforated layer 3, for example perforated plastic film or shrink tape, is provided on top of the outermost surface of said layers of woven fabric 2.

Additionally, an absorption layer 4 is provided on said perforated layer 3. The absorption layer 4 preferably, but not necessarily comprises a peel-ply.

Advantageously, an external pressure layer 5, for example a layer of shrink tape or elastic tape, can further be provided on said absorption layer 4 to create a pressure on the outer surface of the composite sleeve.

After the resin in the layers of woven fabric 2 has been cured and set, the pressure layer 5, absorption layer 4 and perforated layer 3 are removed and the sleeve assembly is provided.

The present invention is by no way limited to the forms of embodiment described above and depicted in the drawings. A method according to the invention of composing a sleeve assembly, and a sleeve assembly obtained by such method, can realized in different ways, without departure from the scope of the invention.

The invention claimed is:

1. A method of composing a sleeve assembly used for containment purposes in high-speed machines that is subjected to high operational temperatures, said method consisting of the steps of:

providing a composite sleeve comprising a thermally stable polymer;

winding at least two layers of woven fabric on top of said composite sleeve and each other, said woven fabric being impregnated with a thermoset resin and at least one of the at least two layers of woven fabric comprises bidirectional fibers;

winding a perforated plastic layer on top of an outermost layer of said layers of woven fabric to remove excess resin from the woven fabric when the woven fabric is wound over the composite sleeve, said perforated plastic layer being configured to provide an exit path for excess resin, wherein said perforated plastic layer comprises a perforated shrink tape;

wrapping an absorption layer over the composite sleeve for absorbing said excess resin from the exit path of the perforated plastic layer;

applying a pressure layer on top of said absorption layer to create a pressure on an outer surface of the composite sleeve, wherein said pressure layer comprises one or more layers of shrink tape or elastic tape;

curing said thermoset resin while maintaining a pressure on said woven fabric and said absorption layer using the pressure layer, wherein the composite sleeve upon which the layers of woven fabric are applied, comprises a wet composite sleeve that has not yet or only partially been cured, and wherein said wet composite sleeve and the resin in said layers of woven fabric are cured together;

removing said pressure layer, said absorption layer, and said perforated plastic layer after said curing; and providing said cured composite sleeve around permanent magnets on a rotor in a high-speed permanent magnet motor so that the permanent magnets are kept in a precompressed state at all speeds of the high-speed machines.

2. The method of claim 1, wherein at least one of said layers of woven fabric are pre-impregnated with a semi-cured thermoset resin.

3. The method of claim 1, wherein at least one of said layers of woven fabric is impregnated with the same type of resin as the one used during winding of the composite sleeve.

4. The method of claim 1, wherein said perforated plastic layer consists of a pre-perforated layer.

5. The method of claim 1, wherein the step of applying said perforated plastic layer comprises the substeps of applying a layer on top of said layers of woven fabric, and subsequently providing perforations in said layer.

6. The method of claim 1, wherein said absorption layer comprises at least one layer of a peel-ply.

7. The method of claim 1, wherein the pressure on the layers of woven fabric during curing, is provided by the pre-tension of the one or more layers of a peel-ply.

8. The method of claim 1, wherein the bidirectional fibers comprise a first plurality of fibres making part of said woven fabric extend in respective plane extending perpendicularly to a longitudinal central axis of said composite sleeve and wherein a second plurality of fibres making part of said woven fabric extend crosswise with respect to said first plurality of fibres.

9. The method of claim 1, wherein the composite sleeve is obtained by filament winding.

10. A method of composing a sleeve assembly used for containment purposes in high-speed machines that is subjected to high operational temperatures, said method consisting of the steps of:

providing a composite sleeve by filament winding, said composite sleeve comprising a thermally stable polymer;

winding at least two layers of woven fabric on top of said composite sleeve and each other, said woven fabric being impregnated with a thermoset resin and at least one of the at least two layers of woven fabric comprises bidirectional fiber;

winding a perforated plastic layer on top of an outermost layer of said layers of woven fabric to remove excess resin from the woven fabric when the woven fabric is wound over the composite sleeve, said perforated layer being configured to provide an exit path for excess resin, wherein said perforated layer comprises a perforated shrink tape or a layer of perforated plastic;

wrapping an absorption layer over the composite sleeve for absorbing said excess resin from the exit path of the perforated layer;

applying a pressure layer on top of said absorption layer to create a pressure on an outer surface of the composite sleeve, wherein said pressure layer comprises one or more layers of shrink tape or elastic tape;

curing said thermoset resin while maintaining a pressure on said woven fabric and said absorption layer using the pressure layer, wherein the composite sleeve upon which the layers of woven fabric are applied, comprises a wet composite sleeve that has not yet or only partially been cured, and wherein said wet composite sleeve and the resin in said layers of woven fabric are cured together;

removing said pressure layer, said absorption layer, and said perforated layer after said curing; and providing said cured composite sleeve around permanent magnets on a rotor in a high-speed permanent magnet motor so that the permanent magnets are kept in a precompressed state at all speeds of the high-speed machines.

11. The method of claim 10, wherein at least one of said layers of woven fabric is pre-impregnated with a semi-cured thermoset resin.

12. The method of claim 10, wherein at least one of said layers of woven fabric is impregnated with the same type of resin as the one used during winding of the composite sleeve.

13. The method of claim 10, wherein said perforated plastic layer consists of a pre-perforated layer.

14. The method of claim 10, wherein said absorption layer comprises at least one layer of a peel-ply.

15. The method of claim 10, wherein the pressure on the layers of woven fabric during curing, is provided by a pre-tension of one or more layers of a peel-ply.

\* \* \* \* \*